Patented Mar. 10, 1953

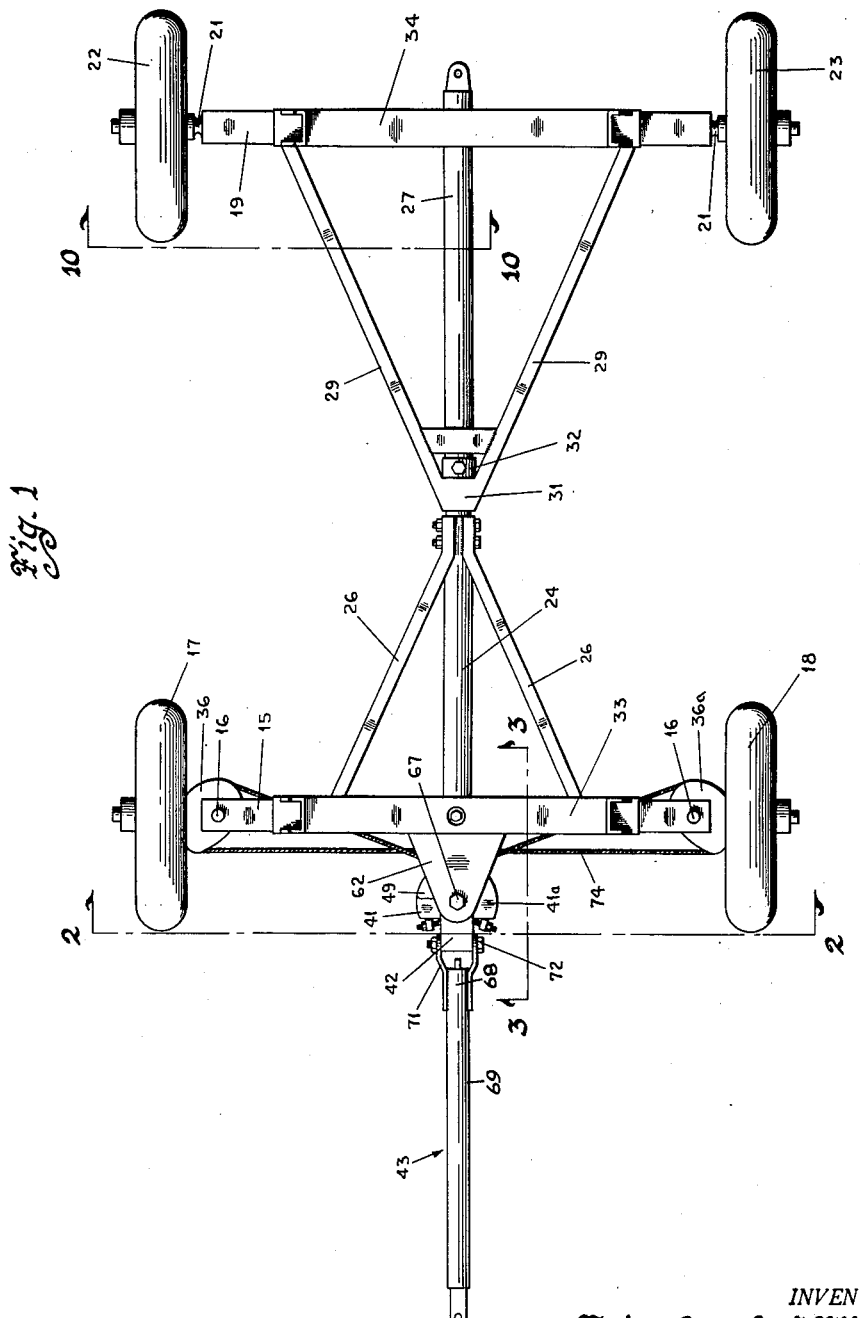

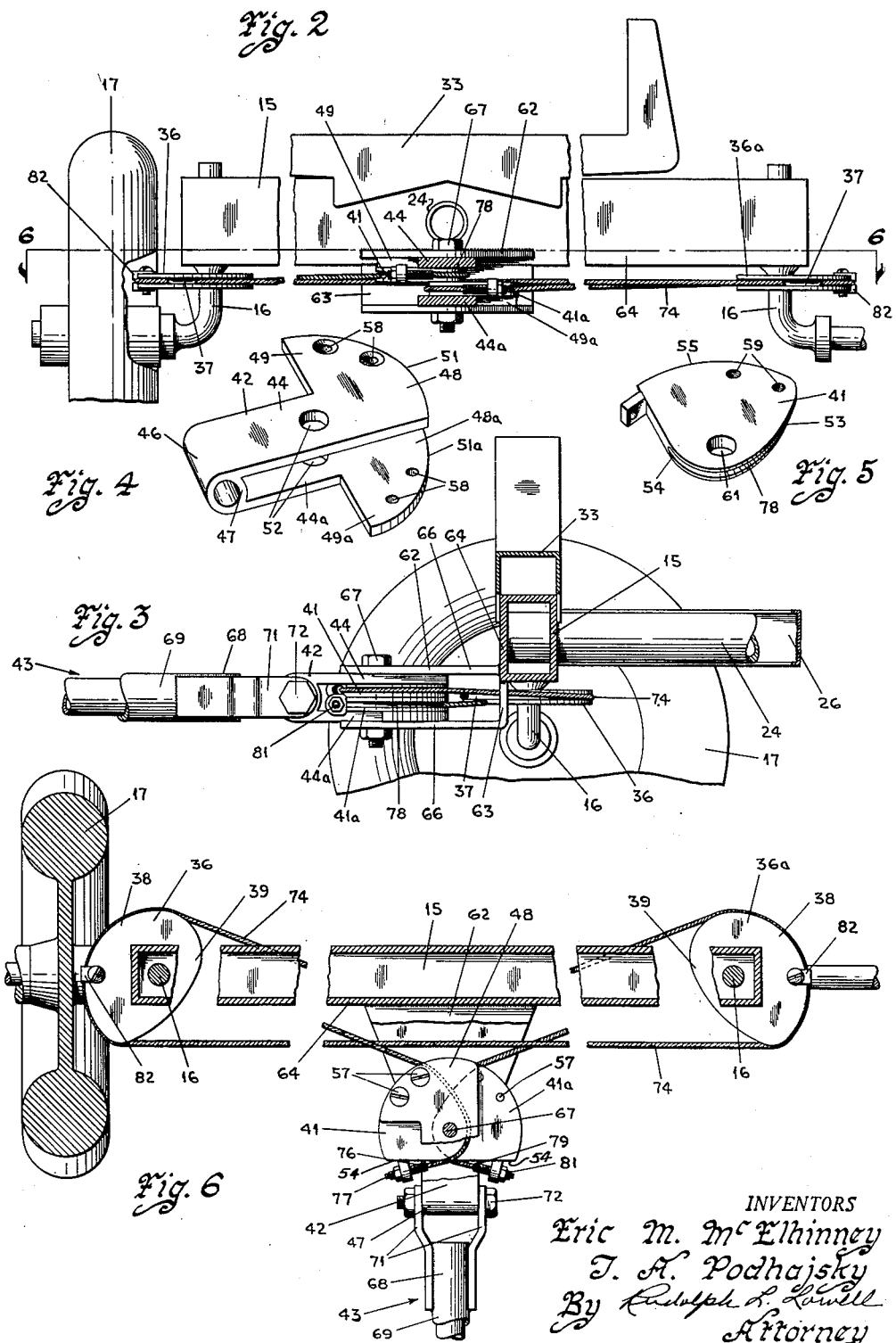
March 10, 1953 — E. M. McELHINNEY ET AL — 2,631,045
SHARP TURN STEERING APPARATUS FOR VEHICLES
Filed July 30, 1949 — 4 Sheets-Sheet 2
INVENTORS
Eric M. McElhinney
J. A. Podhajsky
By Rudolph L. Lowell
Attorney March 10, 1953 E. M. McELHINNEY ET AL 2,631,045
SHARP TURN STEERING APPARATUS FOR VEHICLES
Filed July 30, 1949 4 Sheets-Sheet 3
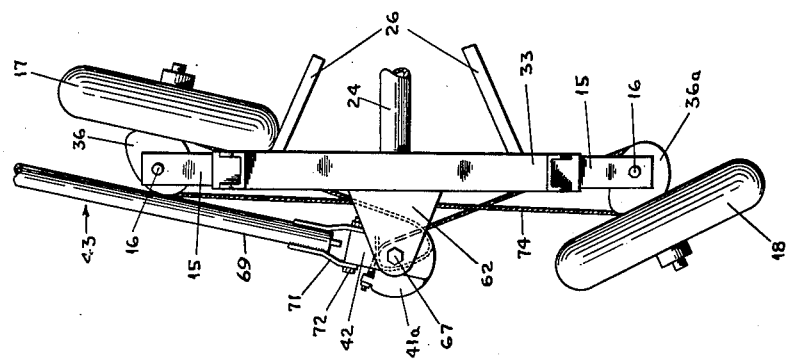
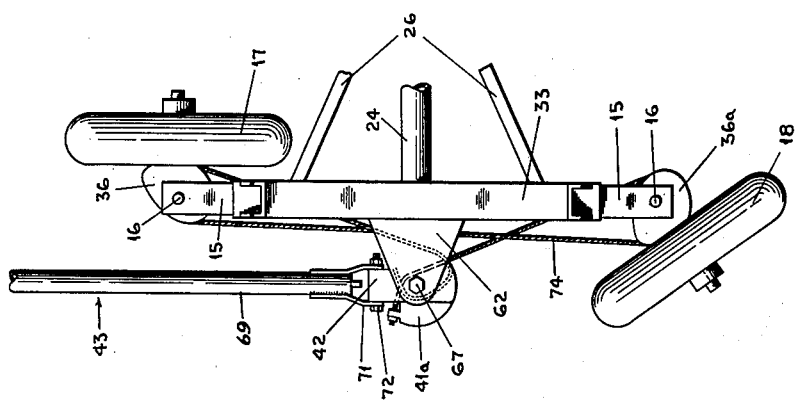
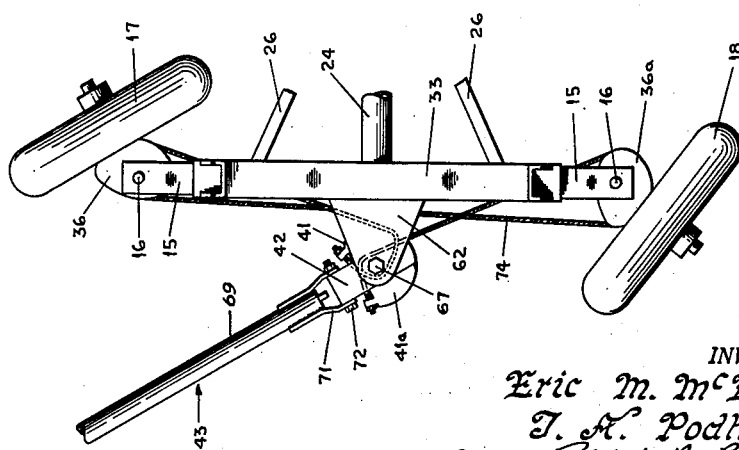
INVENTORS
Eric M. McElhinney
J. K. Podhajsky
By Rudolph L. Lowell
Attorney

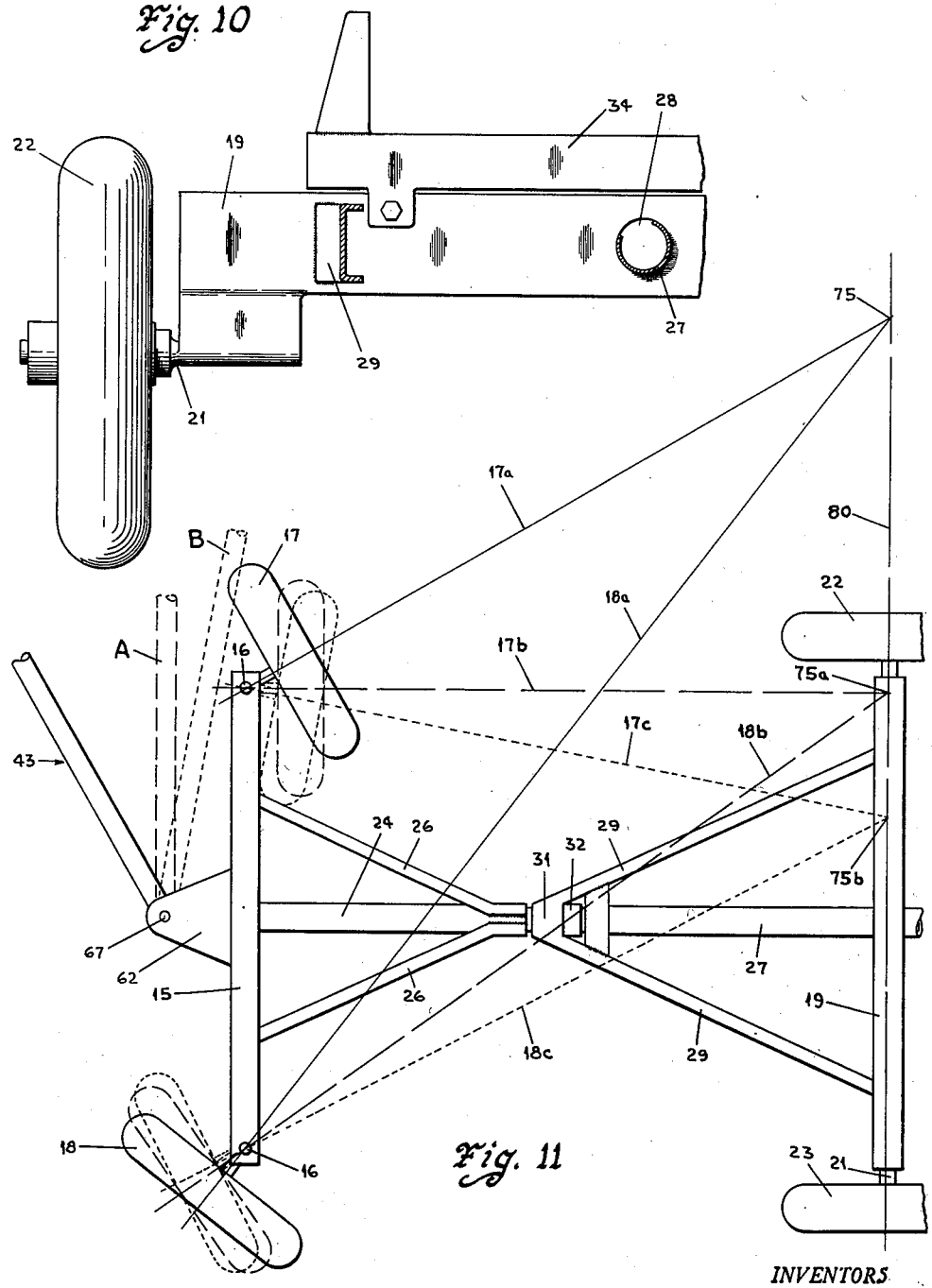

2,631,045

UNITED STATES PATENT OFFICE 2,631,045

SHARP TURN STEERING APPARATUS FOR VEHICLES

Eric M. McElhinney, Dysart, and Theodore A. Podhajsky, Traer, Iowa

Application July 30, 1949, Serial No. 107,724

3 Claims. (Cl. 280—103)

This invention relates generally to steering mechanisms for transversely spaced vehicle front steering wheels having relatively movable spindles, and in particular to a steering mechanism for a farm wagon having a front axle provided with spindle mounted wheels.

Many of the farm wagons of four wheel type now in common use are generally incapable of making a sharp turn commensurate with the turning radius of a usual tricycle type tractor. This is due either to the fact that the wagon steering apparatus does not provide for a substantially one-hundred eighty degree turning movement of the front wheels, or to the fact that when such turning movement is provided the wagon tongue, in a full-turned position therefor, is in a forwardly inclined position relative to the wagon front axle. As a result the front wheels, during a turning movement, are often times skidded along the ground and the wagon tongue is either bent, when made of metal, or broken when made of wood.

It is an object of this invention, therefore, to provide an improved steering apparatus for a vehicle.

A further object of this invention is to provide a steering apparatus for a farm wagon which permits the wagon to easily follow the sharp turning movements of a tricycle or row crop tractor.

Yet another object of this invention is to provide a wagon steering apparatus capable of negotiating a sharp turn with a substantial elimination of any front wheel skidding or bending strain on the wagon tongue.

A still further object of this invention is to provide a wagon steering aparatus of a simple and compact construction, quiet and efficient in operation, and adapted to be assembled on a wagon without interfering in any way with the free movement of the wagon tongue and steering wheels to a sharp-turn position.

Yet another object of this invention is to provide a wagon steering apparatus of a construction such that the turning radii of the steering wheels, in a sharp turn, intersect within the transverse dimension or wheel tread of the wagon.

A feature of this invention is found in the provision of a steering apparatus for a vehicle having a front axle with pivoted spindles, and a draft member or tongue pivoted on the axle for horizontal movement, in which each spindle carries a fixed horizontal cam and the draft member a pair of superposed horizontal cams, movable with the draft member, and arranged concentrically relative to the pivot for the draft member. A single cable is secured under tension about all of the cams, the contours of which are such that the cable tension is substantially uniform for all moved positions of the draft member and the draft member is maintained in a substantially parallel relation with the wheel leading in the direction of a turn.

Yet another feature of this invention is found in the provision of a steering apparatus for a vehicle having a front axle with pivoted wheel spindles and a pivoted horizontally movable draft member, in which cooperating horizontal cams on the spindles and draft member are connected through a flexible means and relatively constructed to move the front wheels through a sharp turning movement of substantially one hundred eighty degrees, with the radii of the wheels in a sharp-turn position intersecting at a point within the longitudinal confines of the front axle.

Further objects, features and advantages of this invention will appear from the following description when taken in connection with the accompanying drawings, in which:

Fig. 1 is a plan view of a farm wagon embodying the steering apparatus of this invention, with the steering apparatus being shown in a straight pull position therefor;

Fig. 2 is an enlarged foreshortened sectional view as seen along the line 2—2 in Fig. 1, with certain parts removed for the purpose of clarity;

Fig. 3 is an enlarged sectional detail view taken on line 3—3 in Fig. 1;

Fig. 4 is a detail perspective view of a lever member embodied in the steering apparatus of this invention;

Fig. 5 is a detail perspective view of a cam member which forms a part of the steering apparatus of this invention;

Fig. 6 is a sectional view as seen along the line 6—6 in Fig. 2 with certain parts being broken away to more clearly show the construction of the steering apparatus;

Figs. 7, 8 and 9 are plan views of the front end of the wagon in Fig. 1, showing the steering apparatus of this invention in changed positions, relative to its illustration in Fig. 1;

Fig. 10 is an enlarged sectional detail view taken along the line 10—10 in Fig. 1; and Fig. 11 is a diagrammatic plan view of the wagon in Fig. 1, showing the turning radii of the front wheels for various steering positions therefor.

With reference to the drawings the steering apparatus of this invention is illustrated in Figs.

1 and 2 in assembly relation with a wagon having a front axle 15 equipped at its opposite ends with pivoted spindles 16 for supporting front steering wheels 17 and 18. The rear axle 19 (Figs. 1 and 10) carries fixed spindles 21 for rear wheels 22 and 23.

Extended rearwardly from the front axle 15 is a tubular reach 24 having front axle braces 26 (Fig. 1). The rear end 27 of the reach 24 is rotatably extended through an opening 28 formed in the rear axle 19 (Figs. 1 and 10). A rear axle brace structure 29, for the reach 24, has its front end 31 rotatably mounted on the reach, and is maintained against movement longitudinally of the reach by an adjustable locking means, indicated generally at 32. The locking means 32 is adjustable longitudinally of the reach 24 to provide a variable wheel base for the wagon. Bolsters 33 and 34 are suitably mounted on the front axle 15 and rear axle 19, respectively.

The steering apparatus of this invention includes a pair of like cam members 36 and 36a (Figs. 1, 2 and 6) which are fixed in a common horizontal plane on the front wheel spindles 16 at positions below the front axle 15. As best appears in Fig. 6, the cams 36 and 36a are of an irregular shape, with each thereof having one side 38 of a semi-circular contour and an opposite side 39 of a substantially flat or linear contour, and are formed in their peripheries with cable-receiving grooves 37.

A second pair of like cams 41 and 41a are assembled as a unit with the rear section 42 of a wagon tongue, indicated generally at 43. The tongue section 42 (Figs. 3 and 4) is of a substantially U-shape with its legs 44 and 44a arranged in a vertically spaced relation. Integrally formed at the front end or base 46 of the tongue section 42 is a transverse bearing sleeve 47. The rear or free ends 48 and 48a of the legs 44 and 44a, are formed with oppositely extended lateral projections 49 and 49a, the rear edge portions of which, as indicated at 51 and 51a, are of a circular contour.

The cams 41 and 41a are assembled in a superposed relation between the legs 44 and 44a of the tongue section 42 in relatively reversed positions and in a concentric relation with aligned bolt-receiving openings 52 formed in the leg members 44 and 44a.

With reference to Figs. 5 and 6, it is seen that each cam 41 and 41a constitutes substantially a ninety degree segment of a substantially triangular shape with side portions 53 and 54 of reversely curved contours, and a base portion 55 of a convexly curved contour corresponding in size and shape to the contours of the rear edge portions 51 and 51a of the leg members 44 and 44a, respectively, on the tongue section 42.

In the assembly of the cams 41 and 41a with the tongue section 42, the cam 41 is arranged between the leg members 44 and 44a at a position against the inner side of the leg 44 with its base portion 55 mated or flush with the rear edge portion 51 of the leg member 44. The cam 41a is positioned between the leg members 44 and 44a, and against the inner surface of the leg 44a with its base portion 55 in a mating relation with the rear edge portion 51a of the leg 44a. The cams 41 and 41a are maintained in fixed positions relative to their corresponding legs 44 and 44a by countersunk screws 57 extended through openings 58 in the legs 44 and 44a for engagement within threaded openings 59 formed in the cams 41 and 41a.

When thus assembled within the tongue section 42, the cams 41 and 41a are in a superposed or vertically spaced relation, with the junction of their side portions 53 and 54 overlapping each other. This overlapping of the cams 41 and 41a takes place between the bolt openings 52 in the tongue section 42 and the overlapped portions of the cams 41 and 41a are formed with bolt openings 61 in coaxial alignment with the bolt openings 52 in the tongue section 42.

The unit assembly of the tongue section 42 and cams 41 and 41a is pivotally supported for movement in a horizontal plane at a position forwardly of the front axle 15 by the provision of means including a U-shape bracket 62 (Figs. 2 and 3), of a substantially U-shape, having its base 63 secured, as by welding, to the front side 64 of the axle 15, and its leg members 66 projected forwardly from the axle 15 in a horizontal vertically spaced relation. The tongue section 42 and bracket 62 are relatively constructed such that the section 42 is receivable within the bracket 62 with the outer surfaces of its legs 44 and 44a in bearing engagement with the inner surfaces of the bracket legs 66. A pivot bolt 67 is extended through the bracket legs 66, and the openings 52 and 61 in the tongue section 42 and cams 41 and 41a, respectively.

The rear end 68 of the front tongue section 69 (Figs. 3 and 6) terminates in a pair of transversely spaced arms 71 adapted to straddle opposite ends of the bearing sleeve 47. A pivot bolt 72, extended through the arms 71 and the sleeve 47 pivotally supports the front tongue section 69 for up and down movement. It is seen, therefore, that the rear tongue section 42 constitutes a pivoted lever, and the front tongue section 69, an actuating member for pivotally moving the rear tongue section 42 in a horizontal plane. In other words, in instances where the steering apparatus of this invention is applied to a self-propelled vehicle, a suitable gear or link system operated by a steering wheel and connected with the lever 42 may be substituted for the tongue section or actuating member 69.

In the assembly of the cams 36 and 36a on the wheel spindles 16, the cam sides 38 are positioned outwardly, or adjacent to their corresponding front wheels 17 and 18 when the tongue 43 is in a straight-pull position, as shown in Figs. 1 and 6. To accomplish a turning movement of the front wheels 17 and 18 in response to a pivotal movement of the tongue section or lever 42 there is provided a single flexible member such as a cable 74 having one end 76 adjustably secured at 77 to the front side portion 54 of the cam 41 (Fig. 6). The cable 74, from its secured end 76, is supported within a peripheral groove 78, as shown in Fig. 2, formed in the side portions 53 and 54 of the cam 41, and is then extended rearwardly for support within the groove 37 in the cam 36, and on leaving the forward end of the cam 36 is extended longitudinally of the axle 15 at a position forwardly thereof to the forward end of cam 36a for reception within the groove 37 formed in the cam 36a. From the rear end of the cam 36a the cable is received within the groove 78 formed in the cam 41a for the adjustable attachment of its opposite end 79 at 81 to the front or side portion 54 of the cam 41a. Adjustment of the cable 74 is desired to place the cable under initial tension so as to eliminate any slack therein. Suitable clips or clamps 82 on the cams 36 and 36a hold the cable 74 against any slipping movement relative to such cams.

The contour of the cams 36 and 36a relative to the contour of the cams 41 and 41a is such that at any pivotally moved position of the lever or tongue section 42, to in turn provide for a pivotal movement of the spindles 16 through the cams 36 and 36a and cable 74, the initial cable tension is uniformly maintained. In other words, the movement of the cable 74 off of one cam and about another cam takes place at a substantially uniform linear rate of movement.

In the operation of the steering apparatus, assume the tongue 43 to be in its straight pull position illustrated in Figs. 1 and 6. In this position the cams 36 and 36a, and 41 and 41a, are symmetrically arranged relative to the longitudinal axis of the lever or tongue section 42. On movement of the tongue 43 in a right hand turn, from its position shown in Figs. 1 and 6 to its position shown in Fig. 7, the cams 36 and 36a are rotated in a clockwise direction, as viewed in these figures, but at relative speeds so that the wheel 17, leading in the direction of the turn, is moved at a faster rate than the trailing wheel 18. Stated otherwise, even though the length of cable 74 supported between the cams 36 and 36a moves at the same linear rate of speed over its entire length, the contour of the cams 36 and 36a relative to their support on the spindles 16 provides for a slower pivotal movement of the cam 36a relative to the cam 36. In like manner, the contour of the cams 36 and 36a, relative to the contour and assembly of the cams 41 and 41a, maintains a uniform tension in those parts of the cable supported between corresponding cams 36 and 41, and 36a and 41a. It will be noted further, that during this turning movement the tongue 43, and in turn the tongue section or lever 42, is maintained in a parallel relation with the plane of the leading wheel 17.

On a continued turning movement to the right of the tongue 43 from its position shown in Fig. 7, to its position shown in Fig. 8 in which the leading wheel 17 is in a parallel relation with the axle 15 and located rearwardly of the axle, it will be seen that the parallel relation between the tongue 43 and plane of the leading wheel 17 is maintained. For a completed sharp turning movement to the right, as shown in Fig. 9, it is seen that the lead wheel 17 has been turned through an angular distance greater than ninety degrees, from its position shown in Fig. 1, while the trailing wheel 18 has been moved through an angular distance of less than ninety degrees relative to a straight-ahead position therefor, as shown in Fig. 1. At this sharp-turned position, the tongue 43 is inclined rearwardly relative to the front axle 15 and is in a parallel relation with the lead wheel 17.

For a sharp turning movement toward the left, the wheel 18 is turned at a faster rate than the wheel 17, with the tongue 43 being maintained in a parallel relation with the plane of the lead wheel 18.

With reference to Fig. 11, the tongue 43 is shown in full lines at a position corresponding to its right-turned position in Fig. 7. At this position the radii 17a and 18a for the wheels 17 and 18, respectively, intersect at a point 75 located outside of the transverse dimensions or wheel tread of the wagon. On movement of the tongue 43 to its dotted-line position, indicated at A in Fig. 11, and corresponding to the turned position of the tongue 43 in Fig. 8, the radii 17b and 18b for the front wheels 17 and 18, respectively, intersect at a point 75a which is in a line 80 parallel with the front axle 15 and common to the point 75. It will be noted further, that the point 75a is within the transverse confines of the wagon and in a plane extended longitudinally of the wagon common to the spindle 16 for the lead wheel 17.

With the tongue 43 moved to its full-turned position indicated at B in dotted lines in Fig. 11, and corresponding to its position shown in Fig. 9, the radii 17c and 18c for the wheels 17 and 18, respectively, intersect at a point 75b on the line 80 at a position approaching a mid-point of the wagon wheel tread. For a given wheel base and tread of a wagon, and as illustrated in Fig. 11, the line 80 may be coincident with the axis of the rear axle 19. However, even though variations as to wheel base and wheel tread should result in wagons of different types, any skidding of the front wheels 17 and 18 or bending of the tongue 43, during a turning action, is substantially reduced by virtue of the fact that the tongue 43 is always maintained in a parallel relation with the plane of the front wheel leading in the direction of the turn.

From a consideration of the above description, it is seen that the invention provides a steering apparatus for a wagon which is of a simple and compact construction and operable to accomplish a sharp turn of the wagon with a substantial elimination of any skidding of the front wheels, or bending strain on the tongue 43. Further, by virtue of the cam and cable arrangement, the steering apparatus is both positive and substantially noiseless in operation, with the cams being assembled relative to the wagon so as to permit a free turning movement without interference with the wagon or the wheels. As best appears in Figs. 2 and 3, it is seen that the cams 36 and 36a are arranged in a common horizontal plane which is located intermediate the plane of the cams 41 and 41a so as to eliminate any wearing of the cable over those crossed portions thereof extended between the cams 36 and 36a, and the cams 36 and 41 and 36a and 41a.

Although the invention has been described with respect to a preferred embodiment thereof, it is to be understood that it is not to be so limited since changes and modifications can be made therein which are within the full-intended scope of this invention, as defined by the appended claims.

We claim:

1. A steering apparatus for a vehicle having a front axle provided with a pair of pivoted front-wheel spindles comprising, horizontally disposed cam members mounted on said spindles for pivotal movement therewith, a pivoted lever member, means supporting said lever member on said axle for pivotal movement in a horizontal plane, a pair of vertically spaced cam members, corresponding to the cam members on said spindles, and mounted on said lever member for concurrent pivotal movement therewith about a common axis, with the cam members on said spindles being arranged in a common plane disposed between the planes of said vertically spaced cam members, a flexible member trained about said cam members having the opposite ends thereof secured to said vertically spaced cam members, with the cam members on said spindles being eccentrically mounted on said spindles so that the peripheral increments of the effective working surfaces thereof are located unequal distances from the axes of said spindles, and said vertically disposed cam members having effective working surfaces formed and arranged relative to the effective cam surfaces on said spindle cam members whereby said flexible member is maintained under constant tension for all moved positions of said lever member, and an actuating member for pivotally moving said lever member 2. A steering apparatus for a vehicle having a front axle provided with a pair of pivoted front-wheel spindles comprising, a pair of oppositely arranged horizontal cam members mounted on said spindles for pivotal movement therewith, a pivoted lever, means pivotally supporting said lever member on said axle for horizontal movement, a pair of vertically spaced oppositely arranged cam members mounted on said lever member for concurrent pivotal movement therewith, with the adjacent sides of the cam members on said lever constituting the effective working portions thereof, a flexible member having one end portion secured about one of the cam members on said lever and extended therefrom about one of said spindle cam members, then longitudinally of said axle about the second one of said spindle cam members, and having its opposite end portion secured to the second cam member on said lever, with said spindle cams having curved effective working surfaces forming segments of circles the centers of which are offset relative to the axes of said spindles so that the peripheral increments of said segments are located unequal distances from the spindle axes, and said cam members on said lever having a contour relative to the contour of said spindle cam members such that the tension in said flexible member is substantially constant for all moved positions of said lever member, and an actuating member for pivotally moving said lever.

3. A steering apparatus for a vehicle having a front axle provided with a pair of pivoted front-wheel spindles comprising, a draft member, means pivotally supporting said draft member on said front axle for pivotal movement about a vertical axis, a pair of vertically spaced horizontal cam members mounted on said draft member for pivotal movement therewith, said cams being arranged in an overlapping relation concentric with said vertical axis, a pair of horizontal cam members corresponding to and fixed on said wheel spindles, with each of said spindle cam members having one side of a semi-circular contour, located adjacent to a corresponding front wheel and with a spindle cam member being mounted on a wheel spindle such that said one side is non-symmetrical relative to the axis of a wheel spindle, and a flexible member extended under tension about all of said cam members having opposite end portions thereof secured to said vertically spaced cam members, said vertically spaced cam members having a contour relative to the cam members on said wheel spindles over those portions thereof contacted by said flexible member, such that the draft member in a steering operation is maintained in a parallel relation with the front wheel leading in the direction of a turn.

ERIC M. McELHINNEY.
THEODORE A. PODHAJSKY.

REFERENCES CITED

The following references are of record in the file of this patent:

UNITED STATES PATENTS

| Number | Name | Date |
|---|---|---|
| 935,610 | Mauksch | Sept. 28, 1909 |
| 949,202 | Shedenhelm | Feb. 15, 1910 |
| 1,069,810 | Riemer | Aug. 12, 1913 |
| 1,133,875 | Monroe | Mar. 30, 1915 |